United States Patent
Zhu et al.

(10) Patent No.: US 11,683,723 B2
(45) Date of Patent: Jun. 20, 2023

(54) METHODS AND SYSTEM FOR OFFLOADING DATA TRAFFIC

(71) Applicant: ZTE Corporation, Guangdong (CN)

(72) Inventors: Jinguo Zhu, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 17/041,821

(22) PCT Filed: Apr. 4, 2018

(86) PCT No.: PCT/CN2018/081872
§ 371 (c)(1),
(2) Date: Sep. 25, 2020

(87) PCT Pub. No.: WO2019/191927
PCT Pub. Date: Oct. 10, 2019

(65) Prior Publication Data
US 2021/0029586 A1  Jan. 28, 2021

(51) Int. Cl.
| | |
|---|---|
| *H04W 28/08* | (2023.01) |
| *H04W 76/12* | (2018.01) |
| *H04W 8/08* | (2009.01) |
| *H04W 28/12* | (2009.01) |
| *H04W 48/16* | (2009.01) |

(52) U.S. Cl.
CPC ......... *H04W 28/0925* (2020.05); *H04W 8/08* (2013.01); *H04W 28/12* (2013.01); *H04W 48/16* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 9,203,563 B2 | 12/2015 | Etemad et al. | |
| 9,706,423 B2 | 7/2017 | Horn et al. | |
| 9,820,187 B2 | 11/2017 | Sirotkin et al. | |
| 10,638,526 B2 | 4/2020 | Zhao et al. | |

(Continued)

FOREIGN PATENT DOCUMENTS

| | | |
|---|---|---|
| CN | 104303542 A | 1/2015 |
| CN | 104541543 A | 4/2015 |

(Continued)

OTHER PUBLICATIONS

Ericsson, "23.501: SMF Service Areas," SA WG2 Meeting #121, S2-173006, May 15-19, 2017, Hangzhou, China, 13 pages.

(Continued)

*Primary Examiner* — Alex Skripnikov
(74) *Attorney, Agent, or Firm* — Perkins Coie LLP (57) ABSTRACT

A method for offloading data traffic involves: receiving, from a first computing device carrying out an anchor session management function, a request to insert an intermediate session management function in a signaling path, wherein the request includes a data network access identifier of a data network to which the data traffic is to be offloaded; using the data network access identifier, selecting a second computing device to carry out an intermediate session management function; and transmitting a message to the second computing device to create a context for the wireless communication device.

16 Claims, 5 Drawing Sheets

(56) References Cited

U.S. PATENT DOCUMENTS

2014/0003322 A1    1/2014   Grinshpun et al.
2017/0303259 A1   10/2017   Lee et al.
2017/0317894 A1   11/2017   Dao et al.
2020/0128450 A1*   4/2020   Wang ................... G06F 16/903

FOREIGN PATENT DOCUMENTS

| CN | 104584634 A | 4/2015 |
| CN | 104662990 A | 5/2015 |
| CN | 105794259 A | 7/2016 |
| CN | 108174421 A | 6/2018 |
| WO | WO-2019159372 A1 * | 8/2019 |

OTHER PUBLICATIONS

International Search Report and Written Opinion dated Feb. 21, 2019 for International Patent Application No. PCT/CN2018/081872, 6 pages.

Samsung, et al., "TS 23.502: Procedure update to support local access to a DN due to UE mobility," SA WG2 Meeting #123, S2-177525, Oct. 27, 2017, Ljubljana, Slovenia, 10 pages.

Extended European Search Report for EP Patent Application No. 18913426.5, dated Oct. 22, 2021, 7 pages.

* cited by examiner

METHODS AND SYSTEM FOR OFFLOADING DATA TRAFFIC

CROSS REFERENCE TO RELATED APPLICATIONS

This patent document is a 35 USC § 371 National Stage application of International Application No. PCT/CN2018/081872 entitled "METHODS AND SYSTEM FOR OFFLOADING DATA TRAFFIC" and filed on Apr. 4, 2018. The entire content of the before-mentioned patent application is incorporated by reference as part of the disclosure of this document.

TECHNICAL FIELD

The present disclosure is related generally to wireless networks and, more particularly, to methods and systems for offloading data traffic.

BACKGROUND

The fifth generation core supports offloading local traffic to a local user plane function while maintaining the central traffic to anchor user plane function at same time. The problem of this scheme is that a single session management function controls both the anchor user plane function and local user plane function.

SUMMARY

The technology disclosed in this patent document can be implemented in embodiments to provide methods and systems for offloading data traffic.

In an embodiment of the disclosed technology, a method for offloading data traffic of a wireless communication device includes receiving, from a first computing device carrying out an anchor session management function, a request message, wherein the request message includes a data network access identifier of a data network to which the data traffic is to be offloaded, using the data network access identifier, selecting a second computing device to carry out an intermediate session management function, and transmitting a message to the second computing device to create a context for the wireless communication device.

In another embodiment of the disclosed technology, a method for offloading data traffic of a wireless communication device includes receiving, from a first computing device carrying out an access and mobility management function, a request to create a communication context for the wireless communication device, wherein the request includes a data network access identifier of a data network to which the data traffic is to be offloaded, using the data network access identifier, selecting a second computing device to carry out an intermediate user plane function, transmitting tunnel information regarding the second computing device to a radio access network over which the wireless communication device communicates, and transmitting traffic filters to the second computing device, wherein the traffic filters indicate that traffic from the wireless communication device is to be offloaded to the data network.

In another embodiment of the disclosed technology, a computing device includes logic circuitry configured to receive, from a first computing device carrying out an anchor session management function, a request message including a data network access identifier of a data network to which data traffic is to be offloaded, and select, based on the data network access identifier, a second computing device to carry out an intermediate session management function, and a transceiver coupled to the logic circuitry to transmit a message to the second computing device to create a context for the wireless communication device. The logic circuitry may be further configured to transmit tunnel information regarding the second computing device to a radio access network over which the wireless communication device communicates, and transmit traffic filters to the second computing device, wherein the traffic filters indicate that traffic from the wireless communication device is to be offloaded to the data network.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

In an embodiment, a method for offloading data traffic involves: receiving, from a first computing device carrying out an anchor session management function, a request message, wherein the request message includes a data network access identifier of a data network to which the data traffic is to be offloaded; using the data network access identifier, selecting a second computing device to carry out an intermediate session management function; and transmitting a message to the second computing device to create a context for the wireless communication device.

According to another embodiment, a method for offloading data traffic involves: receiving, from a first computing device carrying out an access and mobility management function, a request to create a communication context for the wireless communication device, wherein the request includes a data network access identifier of a data network to which the data traffic is to be offloaded; using the data network access identifier, selecting a second computing device to carry out an intermediate user plane function; transmitting tunnel information regarding the second computing device to a radio access network over which the wireless communication device communicates; and transmitting traffic filters to the second computing device, wherein the traffic filters indicate that traffic from the wireless communication device is to be offloaded to the data network.

Figure 1:
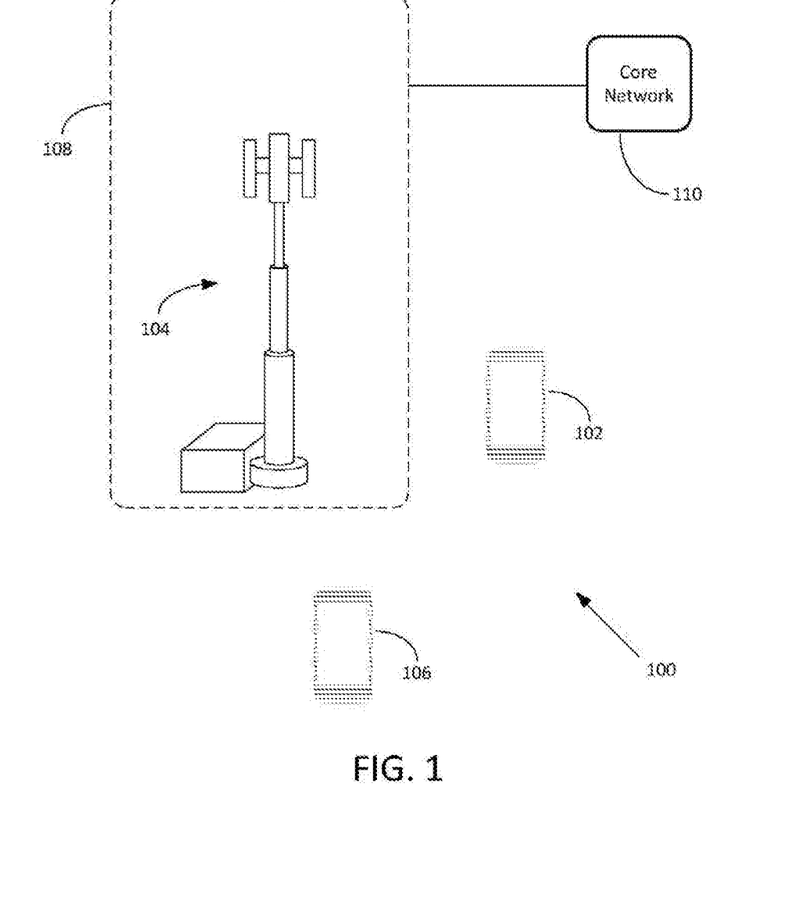
FIG. 1 is a block diagram of a system in which various embodiments of the disclosure are implemented.

FIG. 1 depicts a communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system (e.g., part of a radio access network), a wireless communication device may be referred to as a "wireless network node." A wireless communication device communicates primarily by transmitting and receiving wireless signals.

The second communication device 104 operates as a node of a RAN (such as a "Node B" of a fourth generation or fifth generation RAN) 108. The RAN 108 is communicatively linked to a CN 110. The CN 110 carries are many functions in support of the RAN 108 and has many components.

The following description will sometimes refer to a node and a UE without specific reference to FIG. 1. It is to be understood, however, that all of the methods described herein may be carried out by the communication devices of FIG. 1, and that references to a node, base station, and UE in a general manner are merely for convenience. Also, for each of the procedures described, in an embodiment, the steps are carried out in the order that the language sets forth. In other embodiments, the steps are carried out in different orders.

Figure 2:
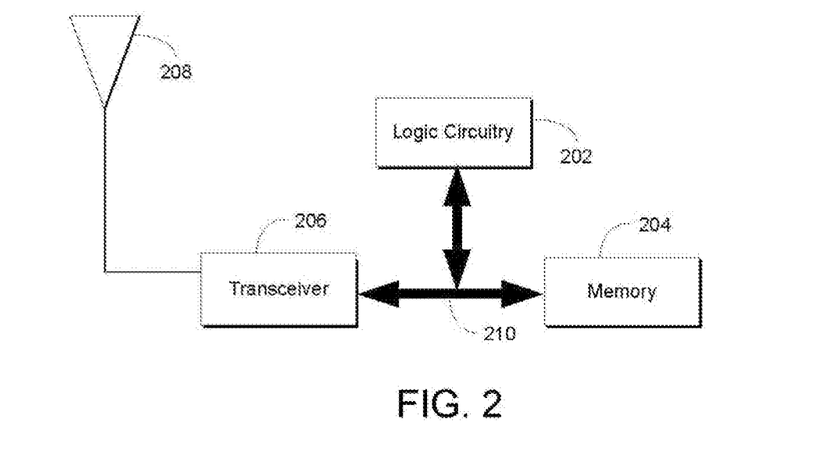
FIG. 2 shows an example hardware architecture of a communication device.

FIG. 2 illustrates a basic hardware architecture implemented by each of the wireless communication devices of FIG. 1, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections. The hardware architecture of FIG. 2 may also be referred to herein as a "computing device."

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Figure 3:
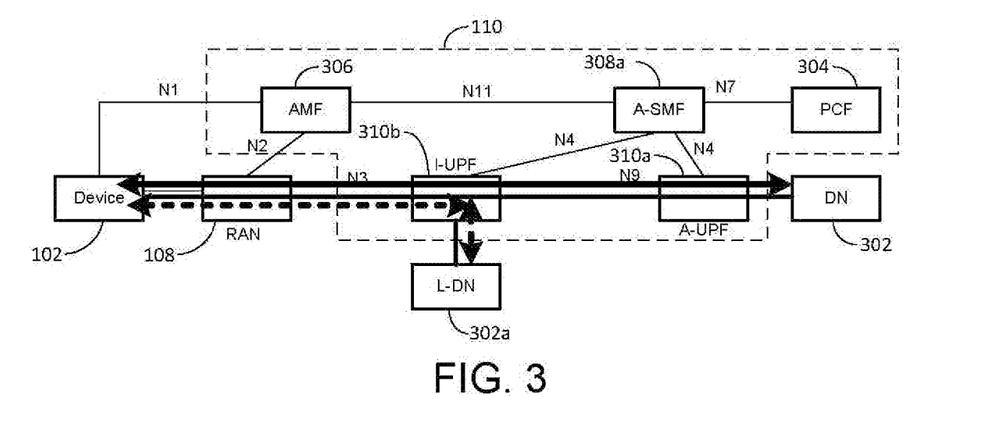
FIG. 3 is a block diagram of a network architecture in which the devices depicted in FIG. 1 and FIG. 2 may be deployed.

Turning to FIG. 3, a network architecture in which the devices depicted in FIG. 1 and FIG. 2 may be deployed will now be described. The network architecture includes the RAN 108, the wireless communication device 102, and the CN 110. The network architecture further includes a data network ("DN") 302 and a local DN 302a.

Continuing with FIG. 3, the CN 110 includes a policy control function ("PCF") 304, an access and mobility management function ("AMF") 306, an anchor session management function ("A-SMF") 308a, an anchor user plane function ("A-UPF") 310b, and an intermediate user plane function ("I-UPF") 310b.

The AMF 306 provides the following services: registration management, connection management, reachability management, and mobility management. The AMF also carries out access authentication and access authorization. The AMF 306 acts as the non-access stratum ("NAS") security termination and relays the session management ("SM") NAS between a UE and an SMF.

The A-SMF 308a provides the following services: session Management (e.g., session establishment, modify and release), UE internet protocol ("IP") address allocation and management (including optional authorization), selection and control of user plane ("UP") functions, and downlink ("DL") data notification. During mobility, the A-SMF 308a of the protocol data unit ("PDU") session is kept unchanged to support seamless handover.

The I-UPF 310a and A-UPF 310b provides the following services: serving an anchor point for Intra-/Inter-radio access technology ("RAT") mobility, packet routing and forwarding, traffic usage reporting, quality of service ("QoS") handling for the user plane, DL packet buffering, and DL data notification triggering. During mobility the A-UPF 310b is kept unchanged to support seamless handover. The I-UPF 310b may need to be inserted be in the user plane data path between the RAN 108 and the A-UPF 310a. The I-UPF 310b provides a traffic offloading function to offload some data traffic to L-DN 302a as shown by the dashed line in FIG. 3.

The PCF 304 provides the following services: access related policy rules to the AMF 306 and provides session related policy rules to A-SMF 308a. Specifically, the PCF 304 provides traffic steering rules to the A-SMF 308a to determine which traffic should be offloaded to a local data network identified by a data network access identifier ("DNAI").

It is to be understood that, although the devices of FIG. 3 have names that end in "function" or "entity," they are, in fact, computing devices that carry out functions (e.g., under the control of software). Thus, for example, the AMF 306 is a computing device (or multiple computing devices working in concert) that carries out functions described herein.

The various devices in FIG. 3 communicate with one another in various ways, including the well-known interfaces shown with the lines labeled 'Nx'. Also, each of the devices depicted in FIG. 3 are meant to be representative. For example, there may be many SMFs and UPFs in the CN 110, and there may be multiple RANs, which the device 102 may encounter when it moves from location to location.

Figure 4:
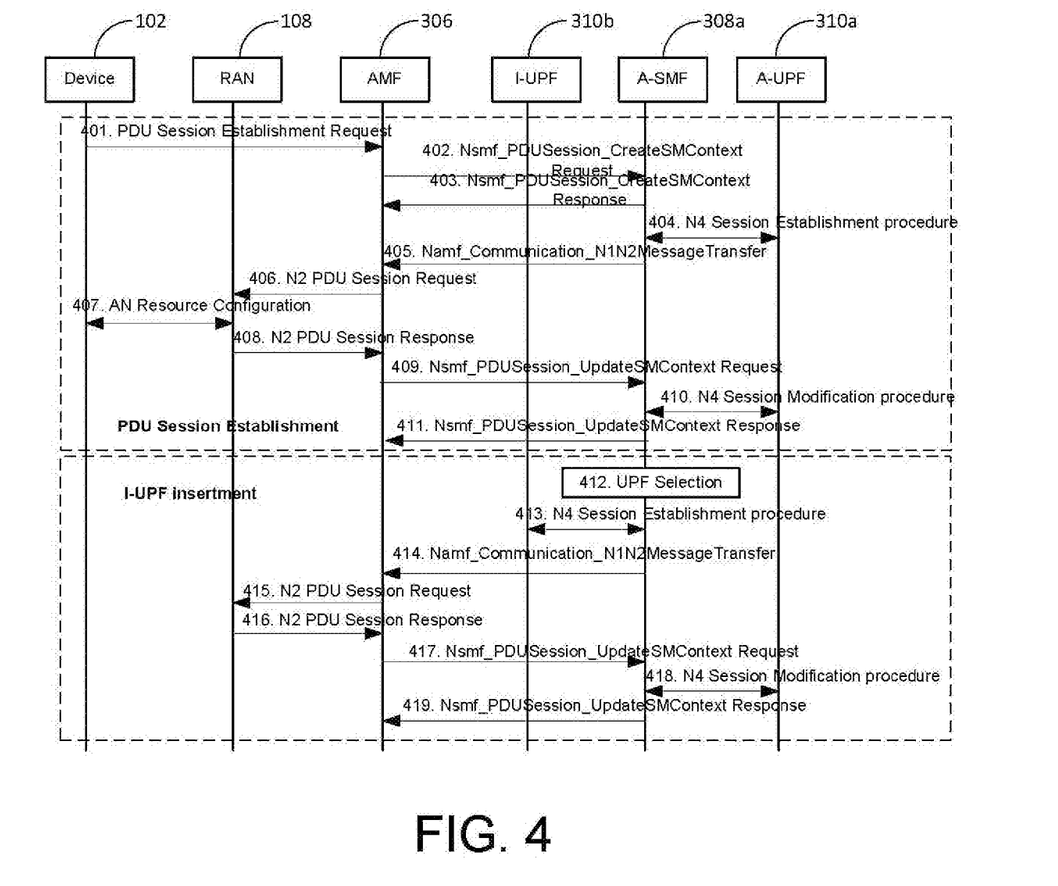
FIG. 4 is an example of how data offloading is carried out using currently-existing techniques.

Turning to FIG. 4, an example of a procedure for establishing a PDU Session and inserting an I-UPF to establish the offload path will now be described.

At 401, the wireless communication device 102 transmits the following to the AMF 306: NAS Message (DNN, PDU Session identifier ("ID"), N1 session management ("SM") container (PDU Session Establishment Request)). In order to establish a new PDU Session, the device 102 generates a new PDU Session ID. The device 102 initiates the UE Requested PDU Session Establishment procedure by the transmission of a NAS message containing a PDU Session Establishment Request within the N1 SM container. The NAS message sent by the device 102 is encapsulated by the RAN in an N2 message towards the AMF 306.

At 402, the AMF 306 selects an A-SMF (A-SMF 308a in this example) based on the requested DNN and other information. The AMF 306 sends an Nsmf_PDUSession_CreateSMContext Request (subscriber permanent identifier ("SUPI"), DNN, PDU Session ID, AMF ID, N1 SM container (PDU Session Establishment Request). The SUPI uniquely identifies the device 102 subscription. The AMF ID is the device 102's globally unique AMF ID ("GUAMI"), which uniquely identifies the AMF serving the device 102. The AMF 306 forwards the PDU Session ID together with the N1 SM container containing the PDU Session Establishment Request received from the device 102.

At 403, if the A-SMF 308a is able to process the PDU Session establishment request, the A-SMF 308a creates an SM context and responds to the AMF 306 by providing an SM Context Identifier in anNsmf_PDUSession_CreateSMContext Response.

At 404, the A-SMF 308a selects an A-UPF (A-UPF 310a in this example) based on the DNN and other information. The A-SMF 308a sends an N4 Session Establishment Request to the A-UPF 310a and provides packet detection, enforcement and reporting rules to be installed on the A-UPF 310a for this PDU Session. If the CN Tunnel Info is allocated by the A-SMF 308a, the CN Tunnel Info is provided to A-UPF 310a in this step. The A-UPF 310a acknowledges by sending an N4 Session Establishment Response. If CN Tunnel Info is allocated by the A-UPF 310a, the CN Tunnel Info is provided to A-SMF 308a in this step.

At 405, the A-SMF 308a transmits to the AMF 306: an Namf_Communication_N1N2MessageTransfer (PDU Session ID, N2 SM information (PDU Session ID, QoS flow identifier(s) ("QFI(s)"), QoS Profile(s), N3 CN Tunnel Info), N1 SM container (PDU Session Establishment Accept)). The N2 SM information carries information that the AMF 306 forwards to the RAN and includes the N3 CN Tunnel Info corresponds to the Core Network address of the N3 tunnel corresponding to the PDU Session, the QoS profiles and the corresponding QFI and the PDU Session ID. The N1 SM container contains the PDU Session Establishment Accept that the AMF 306 provides to the device 102.

At 406, the AMF 306 transmits to the RAN 108: an N2 PDU Session Request (N2 SM information, NAS message (PDU Session ID, N1 SM container (PDU Session Establishment Accept))). The AMF 306 sends the NAS message containing PDU Session ID and PDU Session Establishment Accept targeted to the device 102 and the N2 SM information received from the A-SMF 308a within the N2 PDU Session Request to the RAN 108.

At 407, the RAN 108 engages in an AN specific signaling exchange with the device 102 using the information received from A-SMF 308a. For example, in case of a third generation partnership project ("3GPP") RAN, an RRC Connection Reconfiguration may take place with the device 102 establishing the necessary RAN resources related to the QoS Rules for the PDU Session request. The RAN 108 forwards the NAS message (PDU Session ID, N1 SM container (PDU Session Establishment Accept)) to the device 102. The RAN 108 also allocates AN N3 tunnel information for the PDU Session.

At 408, the RAN 108 transmits to the AMF 306: N2 PDU Session Response (PDU Session ID, Cause, N2 SM information (PDU Session ID, AN Tunnel Info, List of accepted/rejected QFI(s))). The AN Tunnel Info corresponds to the Access Network address of the N3 tunnel corresponding to the PDU Session.

At 409, the AMF 306 transmits to the A-SMF 308a: Nsmf_PDUSession_UpdateSMContext Request (N2 SM information). The AMF 306 forwards the N2 SM information received from the RAN 108 to the A-SMF 308a. If the list of rejected QFI(s) is included in N2 SM information, the A-SMF 308a releases the rejected QFI(s) associated QoS profiles.

At 410, the A-SMF 308a initiates an N4 Session Modification procedure with the A-UPF 310a. The A-SMF 308a provides AN Tunnel Info to the A-UPF 310a as well as the corresponding forwarding rules.

At 411, the A-SMF 308a transmits to the AMF 306: Nsmf_PDUSession_UpdateSMContext Response (Cause). After this step, the PDU Session is successfully established. The device 102 may obtain IP addresses via the user plane of established PDU Session. The PCF 304 may decide to offload some traffic to local data network. The PCF 304 does this by sending a message to the A-SMF 308a with information to identify the PDU Session, information to identify the traffic that needs to be offloaded, and information (e.g., DNAI) to identify where the traffic should be offloaded to.

At 412, the A-SMF 308a selects a local UPF (L-UPF, collocated with I-UPF 310b in this example) based on the DNAI and other information. The L-UPF is used to offload traffic and to connect to the local DN 302. The A-SMF 308a further determines that that the I-UPF 310b can be collocated with the L-UPF.

At 413, the A-SMF 308a transmits an N4 Session Establishment Request to the I-UPF 310b. If CN Tunnel Info is allocated by the A-SMF 308a, the CN Tunnel Info is provided to I-UPF 310b. The I-UPF 310b acknowledges by sending an N4 Session Establishment Response. If CN Tunnel Info is allocated by the I-UPF 310b, the CN Tunnel Info is provided to A-SMF 308a. In this procedure, both N3 CN Tunnel Info and N9 CN Tunnel info are allocated. In this procedure, the A-SMF 308a also provides the I-UPF 310b with the traffic filters that are subject to offloading. The I-UPF 310b uses the traffic filters to identify the packets and forwards the packets towards the local DN 302a.

At 414, the A-SMF 308a transmits to the AMF 306: an Namf_Communication_N1N2Message Transfer (PDU Session ID, N2 SM information (PDU Session ID, N3 CN Tunnel Info of I-UPF). The N2 SM information carries information that the AMF 306 forwards to the RAN 108, which includes the N3 CN Tunnel Info of the I-UPF 310b.

At 415, the AMF 306 transmits to the RAN 108: N2 PDU Session Request (N2 SM information). The AMF 306 sends the N2 SM information received from the A-SMF 306a within the N2 PDU Session Request to the RAN 108.

At 416, the RAN transmits to the AMF 306: N2 PDU Session Response (PDU Session ID, Cause).

At 417, the AMF 306 transmits to the A-SMF 308a: an Nsmf_PDUSession_UpdateSMContext Request ( ). The AMF 306 forwards the N2 SM information received from RAN 108 to the A-SMF 308a.

At 418, the A-SMF 308a initiates an N4 Session Modification procedure with the A-UPF 310a. The A-SMF 308a provides N9 CN Tunnel Info of the I-UPF 310b to the A-UPF 310a.

At 419, the A-SMF 308a sends an Nsmf_PDUSession_UpdateSMContext Response to the AMF 306.

A problem with the procedure of FIG. 4 is that there is only one A-SMF, which controls both the A-UPF and the L-UPF/I-UPF. If the A-SMF is not able to control the L-UPF, however, it is not clear how to establish the data path towards the local data network.

Figure 5:
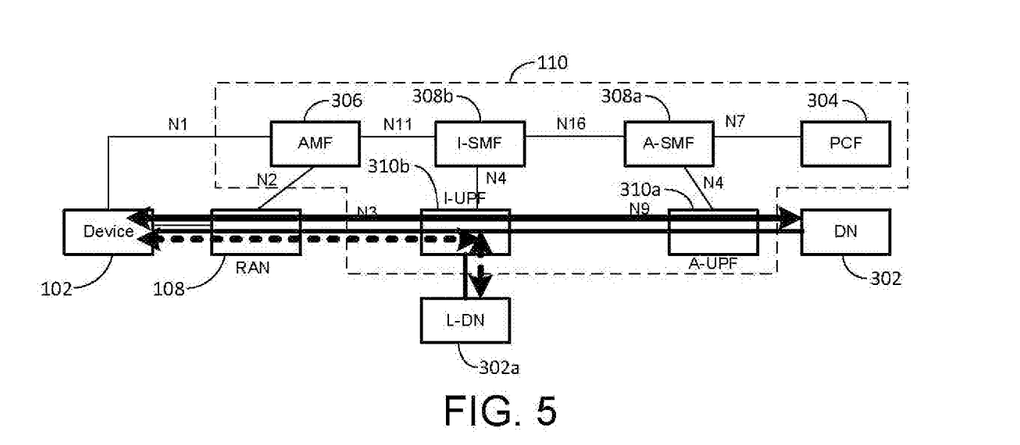
FIG. 5 is a block diagram showing an architecture in which another intermediate session management function between the access and mobility management function and the anchor session management function is selected to control the intermediate user plane function/local user plane function, according to an embodiment.
Figure 6:
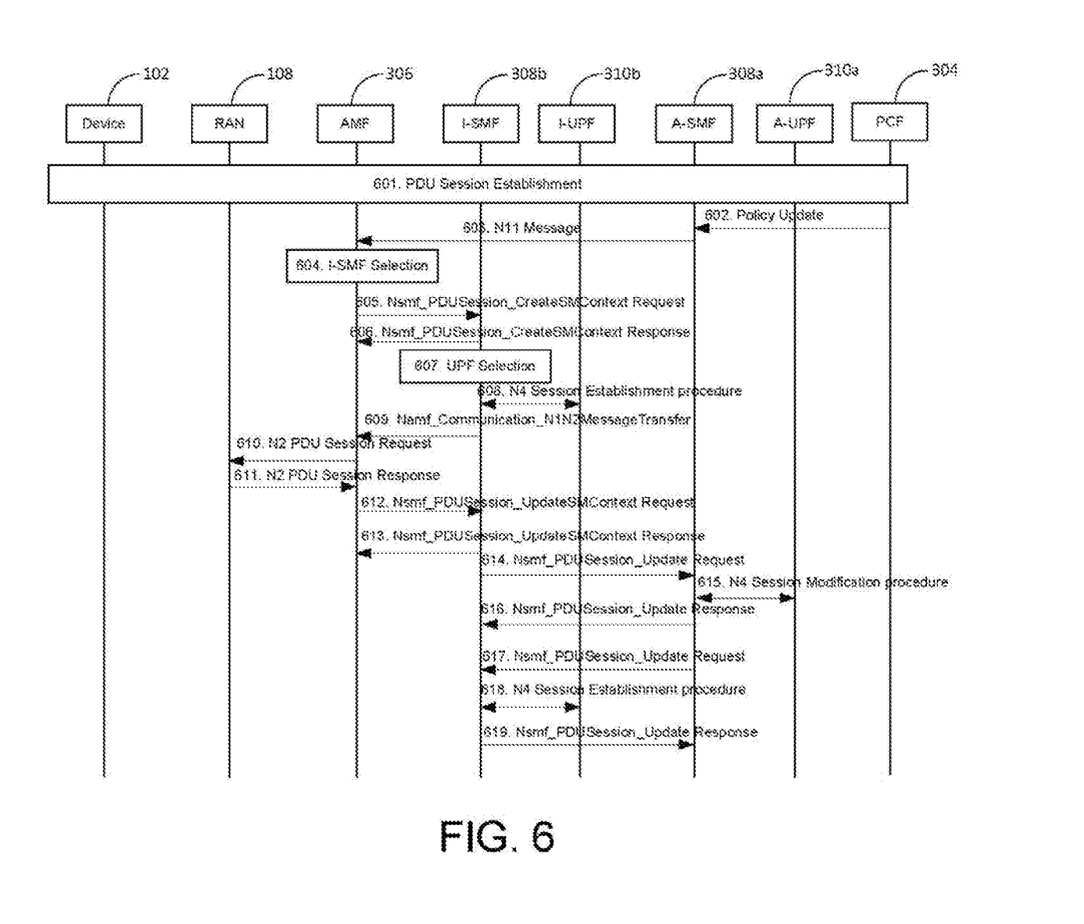
FIG. 6 is a communication flow diagram showing an example how an offload data path is established, according to an embodiment, in the architecture of FIG. 5.

In order to address these issues, an embodiment of the disclosure uses the network architecture of FIG. 5. The components shown in FIG. 5 are the same as those set forth in FIG. 3 except that there is an intermediate SMF (I-SMF) 308b in addition to the A-SMF 308a. The I-SMF 308b is between the AMF 306 and the A-SMF 308a and is selected to control the I-UPF/L-UPF (which are represented by the I-UPF 310b). The I-UPF/L-UPF connects to Local Data Network directly. The components in FIG. 5 are also different from those of FIG. 3 in that, according to an embodiment, they carry out the actions shown in FIG. 6 to establish an offload data path. Further description of FIG. 6 is as follows.

At 601, the device 102 establishes a PDU Session between device 102 and A-UPF 310a.

At 602, the PCF 304 determines that to offload some traffic to local data network. The PCF 304 sends message to A-SMF 308a with information to identify the PDU Session, information to identify the traffic which needs to be offloaded, and information (DNAI) to identify where the traffic should be offloaded to.

At 603, the A-SMF 308a determines that that the target DNAI can't be served by all UPFs controlled by itself, it sends a N11 message to AMF 306 to insert an I-SMF between AMF 306 and A-SMF 308a. This N11 message includes the target DNAI and the PDU Session ID. Optionally, the A-SMF 308a also provides the traffic steering policy for offloading. The traffic steering policy for offloading includes the traffic filters to identify the traffic which are subject to offloading.

At 604, the AMF 306 selects an I-SMF based on the DNN, the target DNAI and other information.

At 605, the AMF 306 sends an Nsmf_PDUSession_CreateSMContext Request (SUPI, DNN, PDU Session ID, AMF ID, target DNAI, address information of A-SMF) to the I-SMF 308b. If Traffic Steering Policy for offloading is received from A-SMF 308a, the AMF 306 also sends the traffic steering policy for offloading to I-SMF 308b.

At 606, the I-SMF 308b creates an SM context and responds to the AMF 306 in an Nsmf_PDUSession_CreateSMContext Response.

At 607, the I-SMF 308b selects the I-UPF/L-UPF based on the target DNAI and other information. The I-UPF/L-UPF is used to offload traffic and connect to the L-DN 302.

At 608, the I-SMF 308b sends an N4 Session Establishment Request to the I-UPF/L-UPF. In this procedure, both N3 CN Tunnel Info and N9 CN Tunnel info are allocated by I-SMF 308b or I-UPF/L-UPF. The I-SMF 308b also provides the AN CN Tunnel info and the CN Tunnel info of A-UPF 310a to the I-UPF/L-UPF. If Traffic Steering Policy for offloading is received, the I-SMF 308b also sends the traffic steering policy for offloading to I-UPF/L-UPF. The I-UPF/L-UPF uses the traffic filters to identify the packets (of the device 102) and forwards the packets towards local data network.

At 609 the I-SMF 308b transmits to AMF 306: Namf_Communication_N1N2MessageTransfer (PDU Session ID, N2 SM information (PDU Session ID, N3 CN Tunnel Info of I-UPF/L-UPF). The N2 SM information carries information that the AMF 306 shall forward to the RAN 108 which includes the N3 CN Tunnel Info of the I-UPF/L-UPF.

At 610, the AMF 306 transmits to the RAN 108: N2 PDU Session Request (N2 SM information). The AMF 306 sends the N2 SM information received from the SMF within the N2 PDU Session Request to the RAN 108.

At 611, the RAN 108 transmits to the AMF 306: N2 PDU Session Response (PDU Session ID, Cause).

At 612, the AMF 306 transmits to the I-SMF 308b: Nsmf_PDUSession_UpdateSMContext Request ( ). The AMF 306 forwards the N2 SM information received from RAN 108 to the I-SMF 308b.

At 613, the I-SMF 308b transmits to the AMF 306: an Nsmf_PDUSession_UpdateSMContext Response ( ).

At 614, the I-SMF 308b transmits to the A-SMF 308a: an Nsmf_PDUSession_Update Request ( ). The I-SMF 308b sends the N9 CN Tunnel Info of I-UPF/L-UPF to the A-SMF 308a.

At 615, the A-SMF 308a initiates an N4 Session Modification procedure with the A-UPF 310a. The A-SMF 308a provides N9 CN Tunnel Info of I-UPF/L-UPF to the A-UPF 310a.

At 616, the A-SMF 308a sends an Nsmf_PDUSession_Update Response to I-SMF 308b.

The steps 614-616 can be performed in parallel with steps 609 to 613.

At 617, if a traffic steering policy for offloading is not sent to AMF 306 in step 602, the A-SMF 308a sends Nsmf_PDUSession_Update Request(Traffic Steering policy for offloading) to I-SMF 308b.

At 618, the I-SMF 308b sends the traffic steering policy for offloading to I-UPF/L-UPF. The I-UPF/L-UPF uses the traffic filters to identify the packets and forwards the packets towards local data network At 619, the I-SMF 308b sends an Nsmf_PDUSession_Update Response to the A-SMF 308a.

Figure 7:
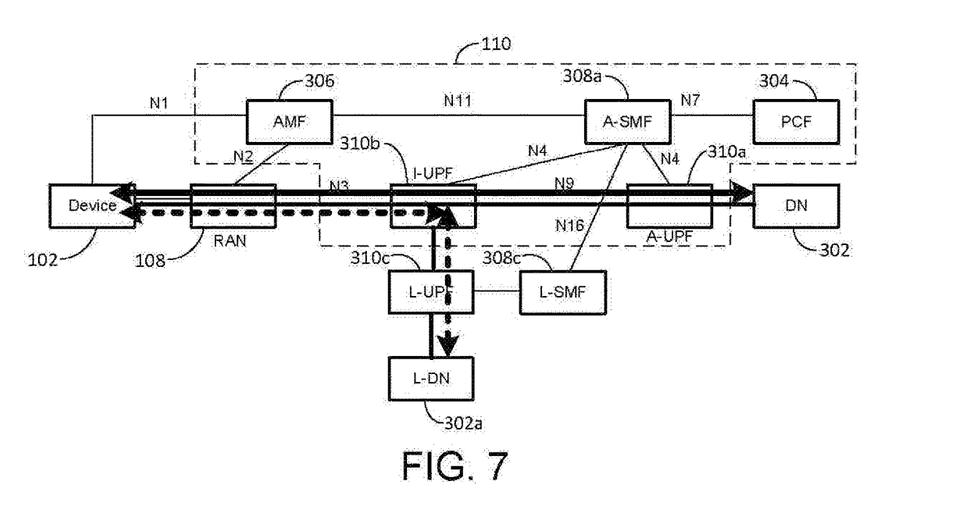
FIG. 7 is a block diagram showing an architecture in which the anchor session management function controls the intermediate user plane function, according to an embodiment.
Figure 8:
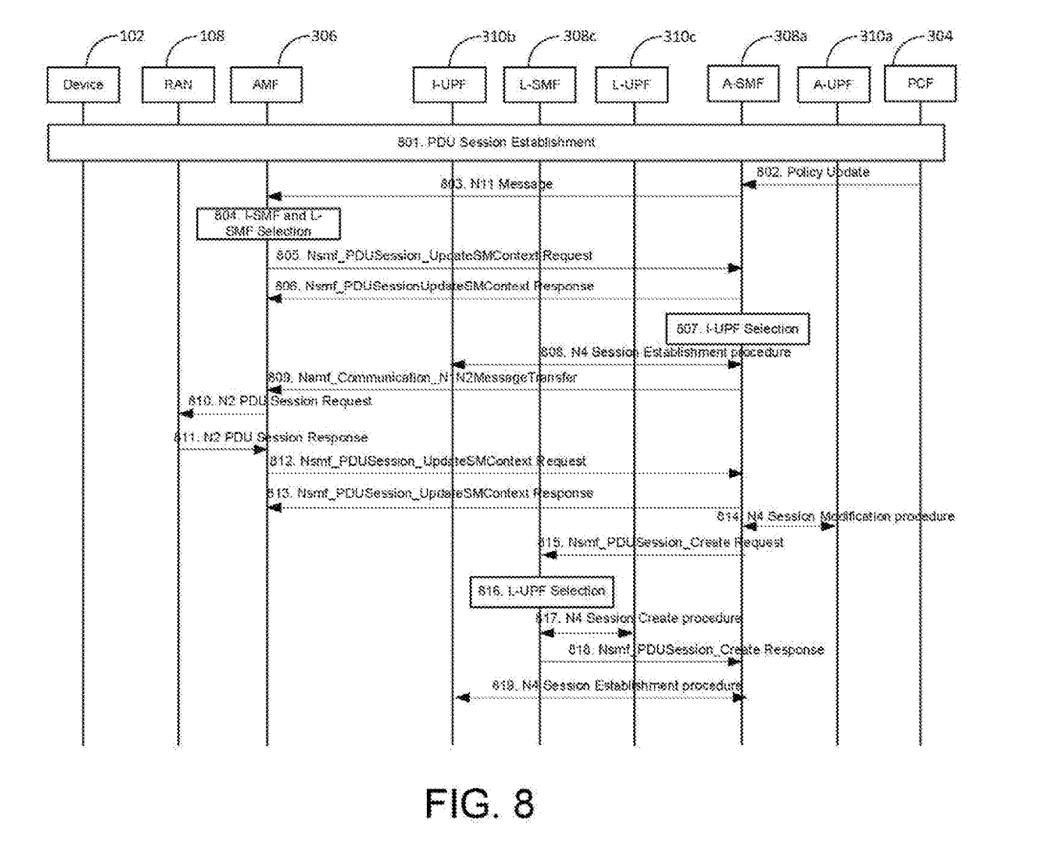
FIG. 8 is a communication flow diagram showing an example how an offload data path is established, according to an embodiment, in the architecture of FIG. 7.

Another embodiment of the disclosure uses the network architecture of FIG. 7. The components shown in FIG. 7 are the same as those set forth in FIG. 3 except that there is a local SMF ("L-SMF") 308c in addition to the A-SMF 308a and a local UPF ("L-UPF") 310c in addition to the A-UPF 310a and the I-UPF 310b. The A-SMF 308a controls the I-UPF 310b. The L-UPF 310c connects to the L-DN 302, which is controlled by the L-SMF 310c. The components in FIG. 7 are also different from those of FIG. 3 in that, according to an embodiment, they carry out the actions shown in FIG. 8 to establish an offload data path. Further description of FIG. 8 is as follows.

At 801, the device 102 establishes a PDU Session between itself and the A-UPF 310a.

At 802, the PCF 304 determines that to offload some traffic to a local data network. The PCF 304 sends a message to the A-SMF 308a with information to identify the PDU Session, information to identify the traffic that needs to be offloaded, and information (e.g., DNAI) to identify where the traffic should be offloaded to.

At 803, the A-SMF 308a determines that that the target DNAI cannot be served by all UPFs controlled by itself. It therefore transmits an N11 message to the AMF 306 to request the insertion of an I-SMF between the AMF 306 and the A-SMF 308a. This N11 message includes the target DNAI and the PDU Session ID. Optionally, the A-SMF 308a also provides the traffic steering policy for offloading. The traffic steering policy for offloading includes the traffic filters to identify the traffic that are subject to offloading.

At 804, the AMF 306 determines that there is no need for an I-SMF. The AMF 306 therefore selects an L-SMF (L-SMF 308c, in this example) based on the DNN, the target DNAI and other information. In another example, the L-SMF 308c may be selected by the A-SMF 308a in step 815.

At 805, the AMF 306 sends an Nsmf_PDUSession_UpdateSMContext Request (SUPI, DNN, PDU Session ID, AMF ID, target DNAI, address information of L-SMF) to the A-SMF 308a.

At 806, the A-SMF 308a responds to the AMF 306 in the Nsmf_PDUSession_CreateSMContext Response.

At 807, the A-SMF 308a selects an I-UPF (I-UPF 310b in this case) based on the target DNAI and other information. The I-UPF 310b is used to offload traffic to local DN 302.

At 808, the A-SMF 308a sends an N4 Session Establishment Request to the I-UPF 310b. In this procedure, both N3 CN Tunnel Info and N9 CN Tunnel info are allocated by the A-SMF 308a or the I-UPF 310b.

The A-SMF 308a also provides the AN CN Tunnel info and the CN Tunnel info of the A-UPF 310a to the I-UPF 310b. The A-SMF 308a may send the traffic steering policy for offloading to the I-UPF 310b. The I-UPF 310b uses the traffic filters to identify the packets from the device 102 and forwards the packets towards the L-UPF 310c.

At 809, the A-SMF 308a transmits to the AMF 306: an Namf_Communication_N1N2MessageTransfer (PDU Session ID, N2 SM information (PDU Session ID, N3 CN Tunnel Info of I-UPF)). The N2 SM information carries information that the AMF 306 forwards to the RAN 108 which includes the N3 CN Tunnel Info of the I-UPF 310b.

At 810, the AMF 306 transmits to the RAN 108: an N2 PDU Session Request (including N2 SM information). The AMF 306 sends the N2 SM information received from the A-SMF 308a within the N2 PDU Session Request to the RAN 108.

At 811, the RAN 108 transmits to the AMF 306: an N2 PDU Session Response (PDU Session ID, Cause).

At 812, the AMF 306 transmits to the A-SMF 308a: an Nsmf_PDUSession_UpdateSMContext Request ( ). The AMF 306 forwards the N2 SM information received from RAN 108 to the A-SMF 308a.

At 813, the A-SMF 308a initiates an N4 Session Modification procedure with the A-UPF 310a. The A-SMF 308a provides the N9 CN Tunnel Info of I-UPF 310b to the A-UPF 310a.

At 814, the A-SMF 308a transmits to the AMF 306: an Nsmf_PDUSession_UpdateSMContext Response ( ).

At 815, the A-SMF 308a transmits to the L-SMF 308c: an Nsmf_PDUSession_Create Request (target DNAI, PDU Session ID, DNN). The A-SMF 308a sends the N9 CN Tunnel of I-UPF 310b to L-UPF 310c. The N9 CN Tunnel info can be the same as that transmitted in step 813, or can be different. The L-SMF address is sent in step 805. In another example, the L-SMF 308c may be selected by the A-SMF 308a.

At 816, the L-SMF 308c selects an L-UPF (the L-UPF 310c in this case) based on the target DNAI and DNN.

At 817, the L-SMF 308c initiates an N4 Session Create procedure with the L-UPF 310c. The L-SMF 310c provides the N9 CN Tunnel Info of the I-UPF 310b to the L-UPF 310c. The N9 CN Tunnel Info of the L-UPF 310c is allocated in this step.

At 818, the L-SMF 308c sends an Nsmf_PDUSession_Create Response (N9 CN Tunnel Info of the L-UPF 310c) to the A-SMF 308a.

At 819, the A-SMF 308a initiates an N4 Session Modification procedure to send the N9 CN Tunnel Info of the L-UPF 310c to the I-UPF 310b. If traffic steering policy is not sent in step 808, the A-SMF 308a sends the traffic steering policy for offloading to the I-UPF 310b. The I-UPF 310b uses the traffic filters to identify the packets and forwards the packets towards the local data network.

Steps 809-813, step 814, and steps 815-819 may be performed in parallel.

Figure 9:
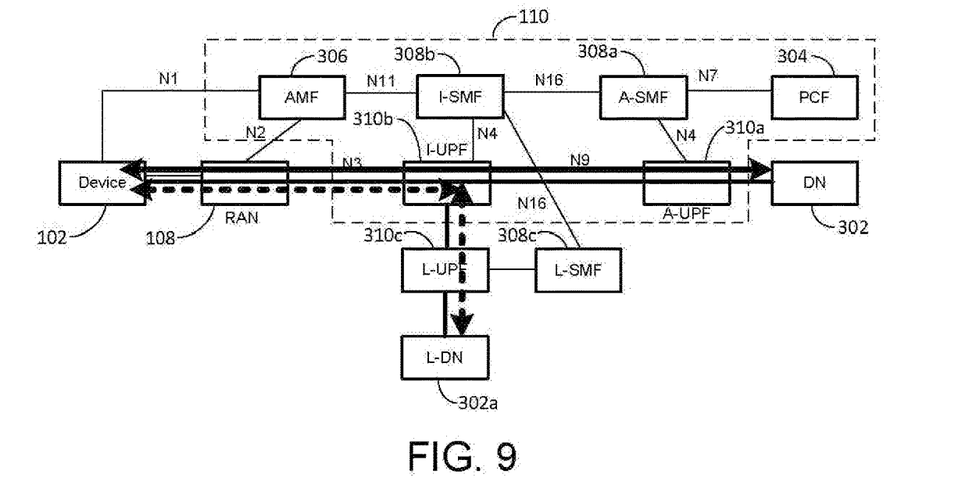
FIG. 9 is a block diagram showing an architecture in which another intermediate session management function between the access and mobility management function and the anchor session management function is selected to control the intermediate user plane function.
Figure 10:
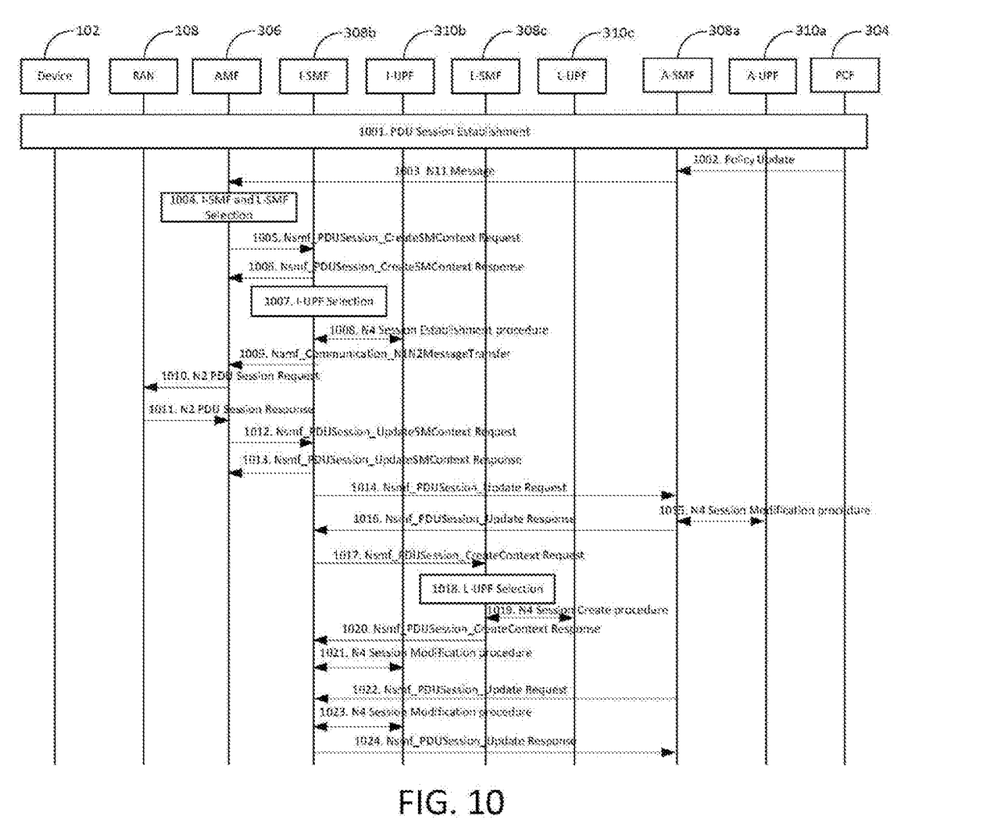
FIG. 10 is a communication flow diagram showing an example how an offload data path is established, according to an embodiment, in the architecture of FIG. 9.

Another embodiment of the disclosure uses the network architecture of FIG. 9. The components shown in FIG. 9 are the same as those set forth in FIG. 3 except that there is an L-SMF 308c in addition to the A-SMF 308a and an L-UPF 310c in addition to the A-UPF 310a and the I-UPF 310b. Furthermore, there is an I-SMF 308b in addition to the A-SMF 308a. The I-SMF 308b controls the I-UPF 310b. The L-UPF 310c is connected to the L-DN 302, which is controlled by the L-SMF 308c. The components in FIG. 9 are also different from those of FIG. 3 in that, according to an embodiment, they carry out the actions shown in FIG. 10 to establish an offload data path. Further description of FIG. 10 is as follows.

At 1001, the device 102 establishes a PDU Session between the device 102 and the A-UPF 310a.

At 1002, the PCF 304 determines that some traffic should be offloaded to the L-DN 302. The PCF 304 sends a message to the A-SMF 308a with information to identify the PDU Session, information to identify the traffic which needs to be offloaded and information (e.g., DNAI) to identify where the traffic should be offloaded to.

At 1003, the A-SMF 308a determines that the target DNAI cannot be served by all UPFs controlled by itself, so it sends an N11 message to the AMF 306, requesting the AMF 306 to insert an I-SMF between the AMF 306 and the A-SMF 308a. This N11 message includes the target DNAI, and the PDU Session ID. Optionally, the A-SMF 308a also provides the traffic steering policy for offloading. The traffic steering policy for offloading includes the traffic filters to identify the traffic which are subject to offloading.

At 1004, the AMF 306 carries out selection of an I-SMF and an L-SMF (I-SMF 308b and L-SMF 308c in this example) based on the DNN, the target DNAI, and on other information. In another example, the L-SMF 308c may be selected by the I-SMF 308b in step 1017.

At 1005, the AMF 306 sends an Nsmf_PDUSession_CreateSMContext Request (SUPI, DNN, PDU Session ID, AMF ID, target DNAI, address of L-SMF, address information of A-SMF 308a) to the I-SMF 308b. If the Traffic Steering Policy for offloading is received from the A-SMF 308a, the AMF 306 also sends the traffic steering policy for offloading to I-SMF 308b.

At 1006, the I-SMF 308b creates an SM context and responds to the AMF 306 in an Nsmf_PDUSession_CreateSMContext Response.

At 1007, the I-SMF 308b selects the I-UPF based on the target DNAI and other information. The I-UPF 310b is used to offload traffic and to connect to L-DN 302.

At 1008, the I-SMF 308*b* sends an N4 Session Establishment Request to the I-UPF 310*b*. In this procedure, both N3 CN Tunnel Info and N9 CN Tunnel info are allocated by the I-SMF 308*b* or by the I-UPF 310*b*.

The I-SMF 308*b* also provides the AN CN Tunnel info and the CN Tunnel info of the A-UPF 310*a* to the I-UPF 310*b*. If Traffic Steering Policy for offloading is received, the I-SMF 308*b* also sends the traffic steering policy for offloading to I-UPF 310*b*. The I-UPF 310*b* uses the traffic filters to identify the packets (of the device 102) and forwards the packets towards the L-UPF 310*c*.

At 1009, the I-SMF 308*b* transmits to the AMF 306: an Namf_Communication_N1N2MessageTransfer (PDU Session ID, N2 SM information (PDU Session ID, N3 CN Tunnel Info of the I-UPF). The N2 SM information carries information that the AMF 306 forwards to the RAN 108, which includes the N3 CN Tunnel Info of the I-UPF 310*b*.

At 1010, the AMF 306 transmits to the RAN 108: an N2 PDU Session Request (N2 SM information). The AMF 306 sends the N2 SM information received from the I-SMF 308*b* within the N2 PDU Session Request to the RAN 108.

At 1011, the RAN 108 to the AMF 306: an N2 PDU Session Response (PDU Session ID, Cause).

At 1012, the AMF 306 transmits to I-SMF 308*b*: an Nsmf_PDUSession_UpdateSMContext Request ( ). The AMF 306 forwards the N2 SM information received from the RAN 108 to the I-SMF 308*b*.

At 1013, the I-SMF 308*b* transmits to the AMF 306: an Nsmf_PDUSession_UpdateSMContext Response ( )

At 1014, the I-SMF 308*b* transmits to the A-SMF 308*a*: an Nsmf_PDUSession_Update Request ( ). The I-SMF 308*b* sends the N9 CN Tunnel Info of the I-UPF 310*b* to the A-UPF 310*a*.

At 1015, the A-SMF 308*a* initiates an N4 Session Modification procedure with the A-UPF 310*a*. The A-SMF 308*a* provides the N9 CN Tunnel Info of I-UPF 310*b* to the A-UPF 310*a*.

At 1016, the A-SMF 308*a* sends an Nsmf_PDUSession_Update Response to the I-SMF 308*b*.

At 1017, the I-SMF 308*b* transmits to the L-SMF 308*c*: an Nsmf_PDUSession_Create Request (target DNAI, PDU Session ID, DNN). The I-SMF 308*b* sends the N9 CN Tunnel Info of the I-UPF 310*b* to the L-UPF 310*c*. The N9 CN Tunnel info can be the same as one in step 1014, or can be different one. In another example, the L-SMF 308*c* may be selected by the I-SMF 308*b* in this step.

At 1018, the L-SMF 308*c* selects an L-UPF (L-UPF 310*c* in this example) based on the target DNAI and DNN.

At 1019, the L-SMF 308*c* initiates an N4 Session Modification procedure with the L-UPF 310*c*. The L-SMF 308*c* provides the N9 CN Tunnel Info of the I-UPF 310*b* to the L-UPF 310*c*. The N9 CN Tunnel Info of the L-UPF 310*c* is allocated in this step.

At 1020, the L-SMF 308*c* 308*a* sends an Nsmf_PDUSession_Create Response (N9 CN Tunnel Info of L-UPF 310*c*) to the I-SMF 308*b*.

At 1021, the I-SMF 308*b* initiates an N4 Session Modification procedure to sends the N9 CN Tunnel Info of the L-UPF 310*c* to the I-UPF 310*b*.

The steps 1009-1013, steps 1014-1016, steps 1017-1021 can be performed in parallel.

At 1022, if the traffic steering policy for offloading is not sent to the AMF 306 in step 1002, the A-SMF 308*a* sends an Nsmf_PDUSession_Update Request (Traffic Steering policy for offloading) to the I-SMF 308*b*.

At 1023, the I-SMF 308*b* sends the traffic steering policy for offloading to the I-UPF 310*b*. The I-UPF 310*b* uses the traffic filters to identify the packets (of the device 102) and forwards the packets towards the L-DN 302.

At 1024, the I-SMF 308*b* sends an Nsmf_PDUSession_Update Response to the A-SMF 308*a*.

Any and all of the methods described herein are carried out by or on one or more computing devices. Furthermore, instructions for carrying out any or all of the methods described herein may be stored on a non-transitory, computer-readable medium, such as any of the various types of memory described herein.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

The invention claimed is:

1. A method for offloading data traffic of a wireless communication device, the method comprising:
receiving, from a first computing device carrying out an anchor session management function, a request message, wherein the request message includes a data network access identifier of a data network to which the data traffic is to be offloaded;
using the data network access identifier, selecting a second computing device to carry out an intermediate session management function; and
transmitting a message to the second computing device to create a context for the wireless communication device,
wherein the anchor session management function provides a traffic steering policy that includes a traffic filter to identify a traffic subject to offloading,
wherein, in a case that an access and mobility management function receives the traffic steering policy from the anchor session management function, the access and mobility management function transmits the traffic steering policy to the intermediate session management function, or in a case that the access and mobility management function does not receive the traffic steering policy from the anchor session management function, the anchor session management function transmits the traffic steering policy to the intermediate session management function.

2. The method of claim 1, further comprising:
receiving the traffic steering policy from a first device; and
forwarding the traffic steering policy to a second device.

3. The method of claim 1, further comprising:
selecting a computing device to carry out a local session management function; and
transmitting an address of the selected computing device to the second computing device.

4. The method of claim 1, further comprising:
receiving, message transfer request including tunnel information regarding a third device carrying out a user plane function;
forwarding the tunnel information to a radio access network over which the wireless communication device communicates.

5. The method of claim 1, further comprising:
receiving session management information from the first computing device; and transmitting the session management information to a radio access network over which the wireless communication device communicates.

6. The method of claim 1, further comprising:
receiving a session management information from a radio access network over which the wireless communication device communicates; and
transmitting the session management information to a computing device that carries out an anchor session management function.

7. The method of claim 1, wherein the second computing device is configured to transmit the traffic steering policy for offloading to a third device carrying out a user plane function.

8. The method of claim 7, wherein the third device is configured to use the traffic steering policy to identify packets of the wireless communication device and forward the packets towards a local data network.

9. A device comprising:
logic circuitry configured to receive, from a first computing device carrying out an anchor session management function, a request message including a data network access identifier of a data network to which data traffic is to be offloaded, and select, based on the data network access identifier, a second computing device to carry out an intermediate session management function; and
a transceiver coupled to the logic circuitry to transmit a message to the second computing device to create a context for a wireless communication device,
wherein the anchor session management function provides a traffic steering policy that includes a traffic filter to identify a traffic subject to offloading,
wherein, in a case that an access and mobility management function receives the traffic steering policy from the anchor session management function, the access and mobility management function transmits the traffic steering policy to the intermediate session management function, or in a case that the access and mobility management function does not receive the traffic steering policy from the anchor session management function, the anchor session management function transmits the traffic steering policy to the intermediate session management function.

10. The device of claim 9, wherein the logic circuitry is further configured to:
transmit tunnel information regarding the second computing device to a radio access network over which the wireless communication device communicates; and
transmit traffic filters to the second computing device, wherein the traffic filters indicate that traffic from the wireless communication device is to be offloaded to the data network.

11. The device of claim 9, further comprising a memory coupled to the logic circuitry to hold incoming transmissions until the logic circuitry processes the transmissions.

12. The device of claim 9, wherein the logic circuitry is further configured to:
receive the traffic steering policy from a first device; and
forward the traffic steering policy to a second device.

13. The device of claim 9, wherein the logic circuitry is further configured to:
select a computing device to carry out a local session management function; and
transmit an address of the selected computing device to the second computing device.

14. The device of claim 9, wherein the logic circuitry is further configured to:
receive, message transfer request including tunnel information regarding a third device carrying out a user plane function;
forward the tunnel information to a radio access network over which the wireless communication device communicates.

15. The device of claim 9, wherein the logic circuitry is further configured to:
receive session management information from the first computing device; and
transmit the session management information to a radio access network over which the wireless communication device communicates.

16. The device of claim 9, wherein the logic circuitry is further configured to:
receive a session management information from a radio access network over which the wireless communication device communicates; and
transmit the session management information to a computing device that carries out an anchor session management function.

* * * * *